United States Patent
Donderici

(10) Patent No.: US 10,094,948 B2
(45) Date of Patent: Oct. 9, 2018

(54) HIGH RESOLUTION DOWNHOLE FLAW DETECTION USING PATTERN MATCHING

(71) Applicant: HALLIBURTON ENERGY SERVICES, INC., Houston, TX (US)

(72) Inventor: Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/895,025

(22) PCT Filed: Sep. 30, 2014

(86) PCT No.: PCT/US2014/058358
§ 371 (c)(1),
(2) Date: Dec. 1, 2015

(87) PCT Pub. No.: WO2015/050882
PCT Pub. Date: Apr. 9, 2015

(65) Prior Publication Data
US 2016/0109610 A1    Apr. 21, 2016

Related U.S. Application Data

(60) Provisional application No. 61/886,434, filed on Oct. 3, 2013.

(51) Int. Cl.
| | | |
|---|---|---|
| *G01V 3/30* | (2006.01) | |
| *E21B 37/00* | (2006.01) | |
| *G01V 1/40* | (2006.01) | |
| *G01V 3/38* | (2006.01) | |
| *E21B 47/10* | (2012.01) | |

(Continued)

(52) U.S. Cl.
CPC ............. *G01V 3/30* (2013.01); *E21B 37/00* (2013.01); *E21B 47/00* (2013.01); *E21B 47/102* (2013.01); *G01V 1/40* (2013.01); *G01V 3/38* (2013.01); *G01V 11/00* (2013.01); *G01V 2210/646* (2013.01)

(58) Field of Classification Search
CPC ............. G01V 3/30; G01V 3/28; E21B 47/00
See application file for complete search history.

(56) References Cited

U.S. PATENT DOCUMENTS

| | | |
|---|---|---|
| 4,292,589 A | 9/1981 | Bonner |
| 5,869,767 A | 2/1999 | Hayward et al. |
| 7,567,649 B1 | 7/2009 | Safai et al. |

(Continued)

OTHER PUBLICATIONS

Definition of Detect by Merriam-Webster.*

(Continued)

*Primary Examiner* — Jermele M Hollington
*Assistant Examiner* — Alvaro Fortich
(74) *Attorney, Agent, or Firm* — Benjamin Fite; Baker Botts L.L.P.

(57) ABSTRACT

An example method for downhole surveying and measuring may include positioning a first conformable sensor proximate to a downhole element. The first conformable sensor may include a flexible material, a transmitter coupled to the flexible material, and a receiver coupled to the flexible material. A response of the downhole element to a signal generated by the transmitter may be measured at the receiver. The response may be processed to determine a feature of the downhole element.

20 Claims, 8 Drawing Sheets

(51) Int. Cl.
*G01V 11/00* (2006.01)
*E21B 47/00* (2012.01)

(56) References Cited

U.S. PATENT DOCUMENTS

| | | | | |
|---|---|---|---|---|
| 2005/0256645 | A1* | 11/2005 | Rabinovich | G01V 3/28 |
| | | | | 702/7 |
| 2007/0284112 | A1 | 12/2007 | Magne et al. | |
| 2008/0099245 | A1* | 5/2008 | Hall | E21B 4/06 |
| | | | | 175/57 |
| 2008/0236836 | A1* | 10/2008 | Weng | E21B 43/26 |
| | | | | 166/336 |
| 2009/0235729 | A1* | 9/2009 | Barthelemy | G01V 1/50 |
| | | | | 73/152.05 |
| 2009/0277630 | A1* | 11/2009 | McDaniel | E21B 43/26 |
| | | | | 166/250.1 |
| 2010/0245114 | A1 | 9/2010 | Celik-Butler et al. | |
| 2010/0250216 | A1* | 9/2010 | Narr | G06F 17/5018 |
| | | | | 703/10 |
| 2010/0307741 | A1* | 12/2010 | Mosse | G01V 3/30 |
| | | | | 166/250.01 |
| 2011/0227577 | A1* | 9/2011 | Zhang | G01V 3/30 |
| | | | | 324/338 |
| 2011/0255370 | A1* | 10/2011 | Hirabayashi | G01V 1/42 |
| | | | | 367/31 |
| 2013/0043381 | A1* | 2/2013 | Smaardyk | E21B 43/04 |
| | | | | 250/269.1 |
| 2013/0213129 | A1* | 8/2013 | Kumar | E21B 47/011 |
| | | | | 73/152.47 |

OTHER PUBLICATIONS

Detect Synonyms, Detect Antonyms by Thesaurus.com.*
International Preliminary Report on Patentability issued in related Application No. PCT/US2014/058358, dated Apr. 14, 2016 (12 pages).
International Search Report and Written Opinion issued in related PCT Application No. PCT/US2014/058358, dated Jan. 14, 2015 (15 pages).
Neil Goldfine, "Surface-Mounted Eddy-Current Sensors for On-Line Monitoring of Fatigue Tests and for Aircraft Health Monitoring", Second Joint NASA/FAA/DoD Conference on Aging Aircraft, Aug. 1998.
Neil Goldfine et al. "Conformable Eddy-Current Sensors and Arrays for Fleetwide Gas Turbine Component Quality Assessment", ASME Journal of Engineering for Gas Turbines and Power, vol. 124, No. 4, pp. 904-909, Oct. 2002.
Neil Goldfine, "MWM-Array Eddy Current Sensors for Detection of Cracks in Regions with Fretting Damage", ASNT Materials Evaluation, Jul. 2002, vol. 60, No. 7.

* cited by examiner

| Feature Type | Parameter 1 | Parameter 2 | Parameter 3 | Parameter 4 | Parameter 5 |
|---|---|---|---|---|---|
| Vertical crack | crack depth | crack width | crack height | | |
| Horizontal crack | crack depth | crack width | crack height | | |
| Linear crack | crack depth | crack width | crack height | crack orientation | |
| Non-linear crack | crack depth | crack width | crack height | crack orientation | crack curvature |
| Crack crack | crack average depth | crack average width | crack average height | crack average orientation | crack density |
| Rectangular hole | hole depth | hole width | hole height | hole orientation | |
| Circular hole | hole depth | hole radius | | | |
| Elliptical hole | hole depth | hole radius 1 | hole radius 2 | | |
| Scale | scale thickness | scale conductivity | scale area | scale shape | |
| Scale cluster | scale thickness | scale conductivity | scale density | | |

Fig. 5

HIGH RESOLUTION DOWNHOLE FLAW DETECTION USING PATTERN MATCHING

CROSS-REFERENCE TO RELATED APPLICATION

The present application is a U.S. National Stage Application of International Application No. PCT/US2014/058358 filed Sep. 30, 2014, and also claims priority to U.S. provisional No. 61/886,434, filed Oct. 3, 2014 and titled "HIGH RESOLUTION DOWNHOLE FLAW DETECTION USING PATTERN MATCHING," both of which are incorporated herein by reference in their entirety for all purposes.

BACKGROUND

The present disclosure relates generally to downhole drilling operations and, more particularly, to high resolution downhole flaw detection using pattern matching. Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

In certain operations, the wellbore may be "cased," meaning that a metal pipe is inserted in the wellbore and secured using a cement layer. Over time these pipes may develop flaws such as corrosion that may affect the operation of the wellbore over time. Other types of flaws such as small fractures may be present in open or uncased wellbores. In certain instances, these flaws may be very small, such that typical downhole measurements tools have difficultly detecting them.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features.

FIG. 5 is a chart of example features and parameters from a reference measurement set, according to aspects of the present disclosure

Figure 1:
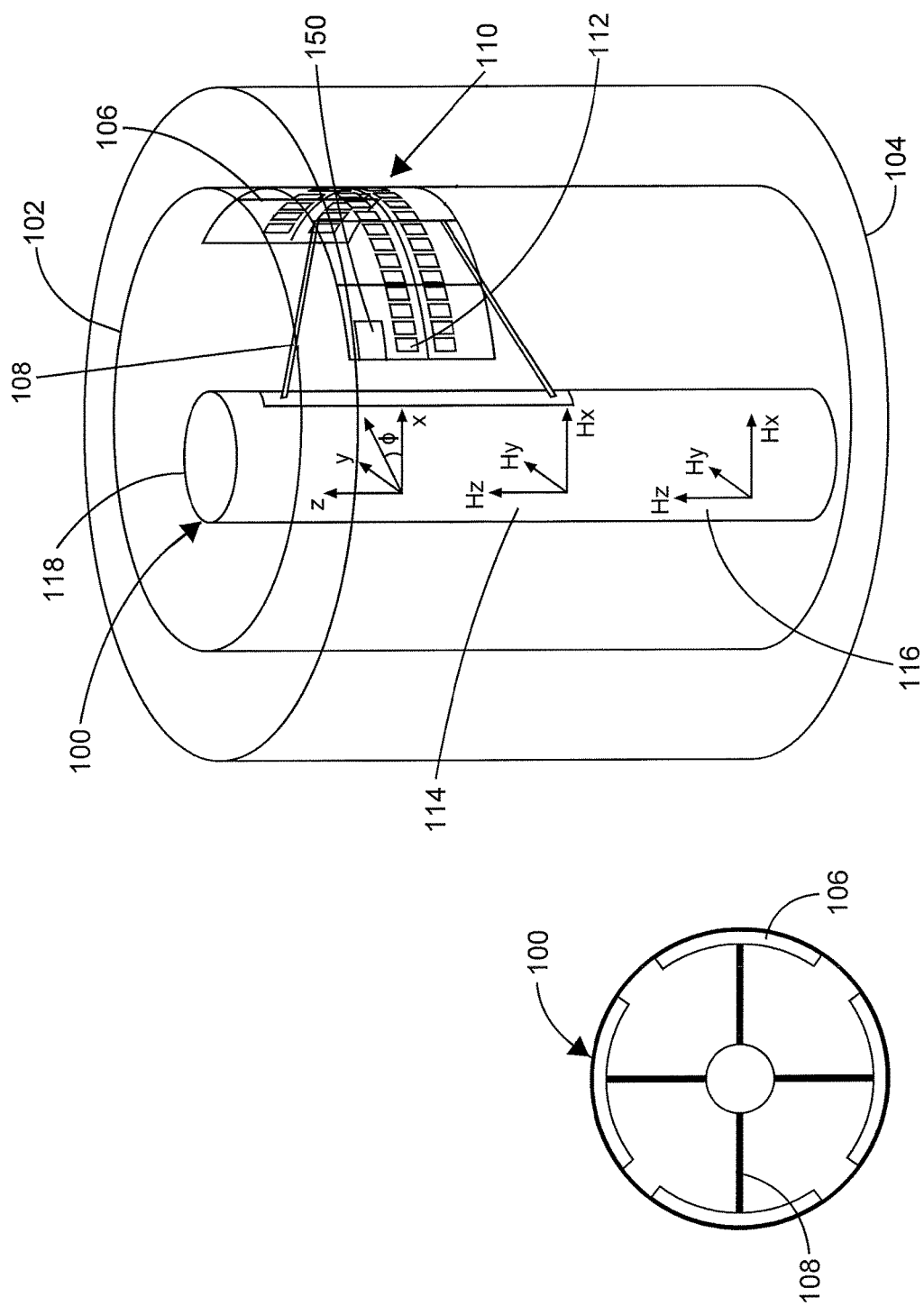
FIG. 1 is a diagram of an example downhole tool with conformable sensors, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to downhole drilling operations and, more particularly, to high resolution downhole flaw detection using pattern matching.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including logging-while-drilling ("LWD") and measurement-while-drilling ("MWD"). In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

Figure 7:
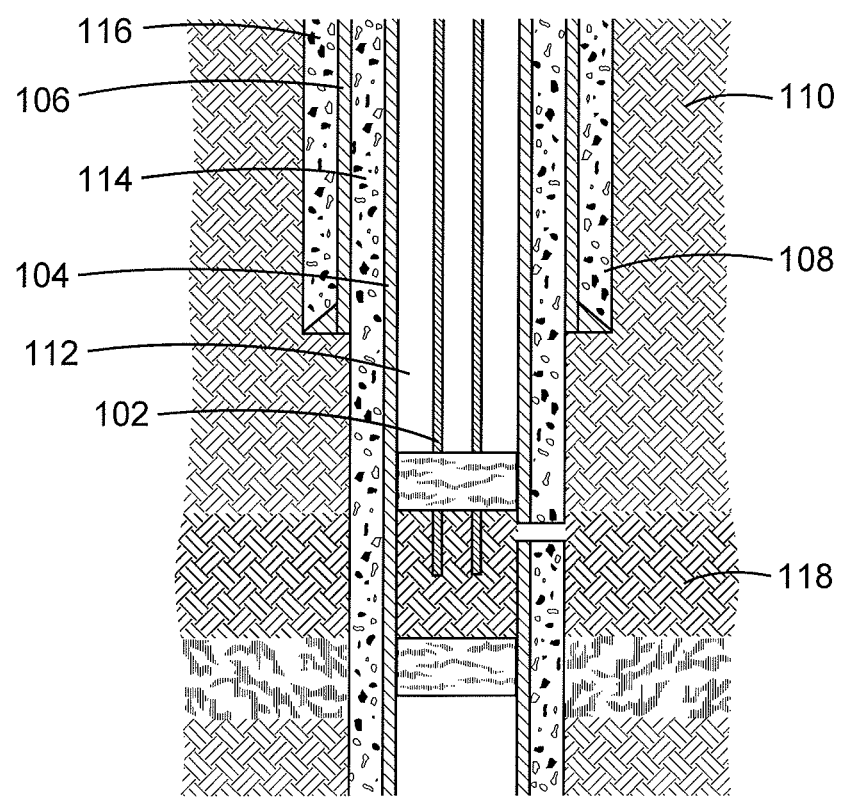
FIG. 7 is a diagram of an example production environment with multiple, concentric casings.

Hydrocarbons may be trapped in porous rock formations thousands of feet below the surface. Recovering the hydrocarbons typically requires drilling a borehole into the porous rock formation so that the hydrocarbons may be pumped to the surface. Metal pipes, referred to as casings, may be secured within the borehole as part of the hydrocarbon recovery operation. FIG. 7 is a diagram of an example production environment and illustrates casings 1002, 1004, and 1006 disposed within a borehole 1008 in a rock formation 1010. The casings 1002-1004 may be concentric or nearly concentric and secured within the borehole 1008 and each other through cement layers 1012, 1014, and 1016. The center casing 1002 may comprise a production casing where hydrocarbon from the formation strata 1018 is received at the surface (not shown).

The casings 1002-1006 may serve numerous purposes within a production and drilling environment, including preventing the borehole 1008 from collapsing after it is drilled and while it is being drilling, protecting a water table in the formation 1010 from contamination, and maintaining pressure within the borehole 1008. Accordingly, damage to the integrity of the casings 1002-1006 is problematic. Common damage to the casings includes crack and corrosion, which can be an indication of a defective cement bond between a casing and the borehole wall.

According to aspects of the present disclosure, a downhole tool with at least one conformable sensor may be placed downhole in either an open hole (non-cased) environment or a cased environment, and may be used in conjunction with a pattern matching processing technique to identify small downhole features of a borehole or casing that are difficult to detect using existing measuring tools. Example features include cracks or corrosion on a casing and fractures in a formation surrounding a borehole. Measurements taken by the at least one conformable sensor may be high resolution, azimuthally sensitive measurements that can be used to visualize the features. As will be described below, a pattern matching scheme with a reference measurement set may be used to process the measurements, increasing the resolution, and allowing for the detection of smaller features than are detectable with the measurements alone.

FIG. 1 is a diagram that shows two views of an example downhole tool 100 with at least one conformable sensors 112, according to aspects of the present disclosure. The downhole tool 100 is shown deployed in concentric pipes 102 and 104, such as in a cased environment. In certain embodiments, the downhole tool 100 may comprise a wireline survey or measurement tool that can be introduced into an open hole (non-cased) environment, a cased environment, or within the bore of a drill string in a conventional drilling assembly. In certain embodiments, the downhole tool 100 may be included in a LWD/MWD segment of a bottom hole assembly (BHA) in a conventional drilling assembly. The tool 100 may be physically and/or communicably coupled to a control unit (not shown) at the surface through a wireline or slickline, or any other conveyance, or through a downhole telemetry systems, such as a mud pulse telemetry system. The tool 100 may also comprise a control unit that is communicably coupled to the conformable sensor 112 of the tool. As used herein, a control unit may include an information handling system or any other device that contains at least one processor communicably coupled to a non-transitory computer readable memory device containing a set of instructions that when executed by the processor, cause it to perform certain actions. Example processors include microprocessors, microcontrollers, digital signal processors (DSP), application specific integrated circuits (ASIC), or any other digital or analog circuitry configured to interpret and/or execute program instructions and/or process data.

At least one conformable sensor 112 may be coupled to a tool body 118 of the downhole tool 100. As used herein, a conformable sensor may comprise a planar sensor that is printed or disposed on a material that can conform to the shape of a surface with which it is in contact. A conformable sensor may include primary windings or transmitters having extended portions for creating an electromagnetic (EM) field in a target, in this case the pipe 102, and secondary windings or receivers within the primary winding for measuring the current response of the target to the generated EM field. The measured current response may be processed to identify physical and electrical parameters of the target and the parameters may be visualized to identify features of the target, as will be described below. The resolution of the measurements taken by the conformable sensor 112 increases as the "stand-off" distance between the sensor 112 and the target decreases.

In the embodiment shown, the conformable sensor 112 is one of an array of conformable sensors 110 disposed on a pad 106 that is coupled to and extendable from the tool body 118 through spring mechanisms or motorized arms 108 to contact the pipe 102. The spring mechanisms or motorized arms 108 may similarly establish contact between the pad 106 and a borehole wall in an open hole environment. The elasticity of the pad 106 and tension in the arm 108 may be designed in such a way that the pad 106 will substantially deform to the shape of the pipe 102, decreasing the stand off distance between the sensor 112 and pipe 102 and increasing the resolution of the resulting measurements. Other pads similar to pad 106 may be arranged on different sides of the tool 100 to mechanically balance the tool 100 within the pipe 102. In other embodiments, expandable arms may be used opposite the pad 106 to mechanically balance the tool 100. In certain embodiments, the array 110 of conformable sensors may be arranged on the pad 106 to perform sensing at different azimuthal positions with respect to the tool body 118. In embodiments where multiple pads are used, each pad may include an array of conformable sensors to perform sensing at different azimuthal positions, and the pads may be arranged with respect to the tool body 118 such that there is full 360 degree coverage around the tool 100, where one pad covers one set of angles, and other stations cover other sets, providing full coverage. Other types of sensors, such as acoustic sensor 150, may also be positioned on the pad 106.

As stated above, the conformable sensor 112 may include at least one portion that functions as a transmitter and generate electromagnetic (EM) fields in a target, such as the pipe 102, and at least one portion that functions as a receiver that receives and measures the current responses of the target to the generated EM fields. In certain embodiments, in addition to the conformable sensors 212, the downhole tool 100 may comprise separate transmitters 114 or receivers 116 mounted on the tool body 118. These additional transmitters 114 or receivers 116 may be inductive-type antennas, realized with coils, solenoids or rotating or moving magnets. In certain embodiments, EM fields may be generated and the corresponding current responses measured with any combination of the transmitter 114, the receiver 112, and the transmitters and receivers within the conformable sensor 112. Notably, when the transmitter is farther away from the receiver, the depth of investigation increases but the measurement resolution decreases.

In use, the downhole tool 100 may generate high resolution measurements of the pipe 102 by placing the pad 106 in contact with the pipe 102 and transmitting a time-varying EM signal from a transmitter of the conformable sensor 112. The signal may generate eddy currents in the pipe 102. The eddy currents may generate secondary currents that contain information about the features of the pipe 102, and the secondary currents may be measured at some or all of the receivers of the conformable sensor 112. Conversely, the downhole tool 100 may generate low-resolution measurements of the pipe 104 by transmitting a time-varying EM signal from transmitter 114 and measuring the current response of the pipe 104 at one or more receivers of the conformable sensor 112.

Figure 2:
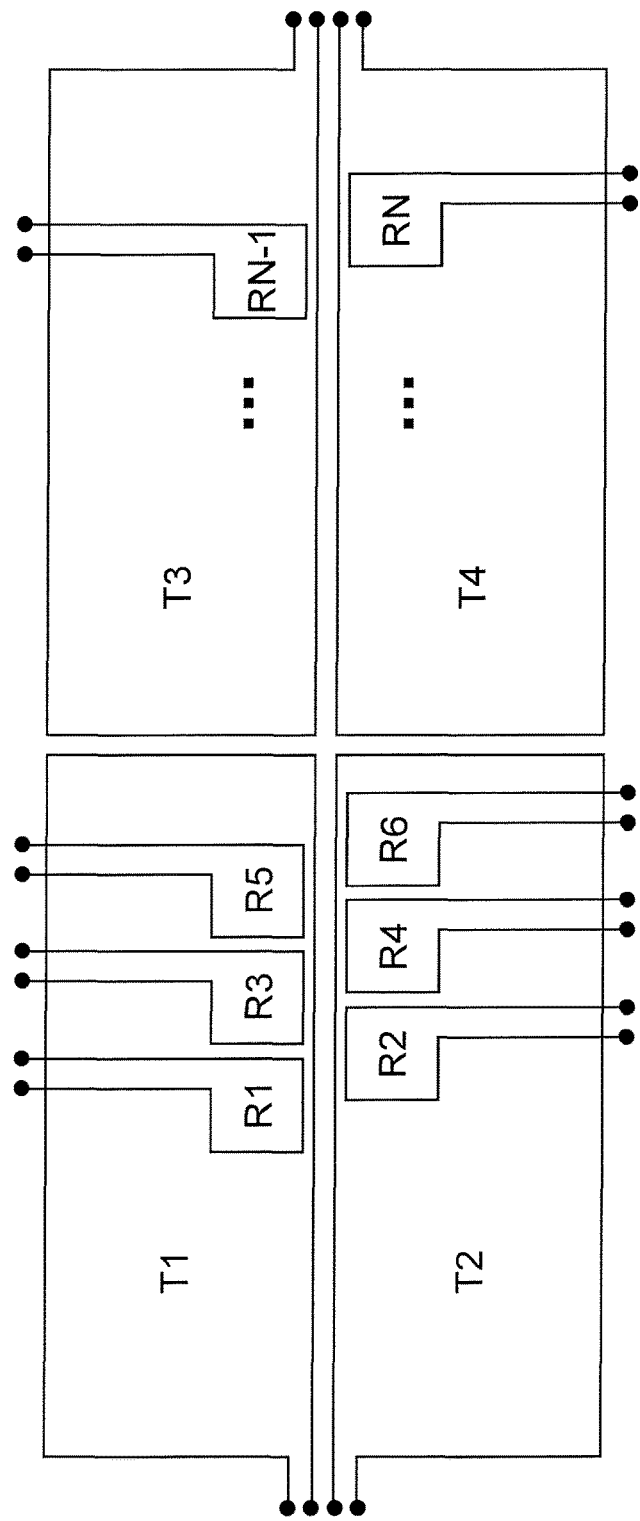
FIG. 2 is a diagram of example antenna windings for a conformable sensor, according to aspects of the present disclosure.

FIG. 2 is a diagram of example antenna windings for a conformable sensor, according to aspects of the present disclosure. The windings shown may comprise the windings for a single conformable sensor and may be formed by circuit printing or other deposition methods on a flexible surface (not shown). As can be seen, the windings include transmitters T1-T4 and staggered receivers R1-RN. The transmitters T1-T4 may comprise primary windings, while the staggered receivers R1-RN may comprise secondary windings. The number and size of the receiver pairs may determine the granularity and resolution of the measurements. Staggering the receivers may double the azimuthal resolution of the sensor since more measurements are made per azimuthal position. Although one example of antenna windings for a conformable sensor is shown in FIG. 2, other configurations are possible. For example, the size and relative positions of the transmitters T1-T4 and receivers R1-RN may be altered, and the functionality of the receivers and transmitters can be switched, e.g., T1 may be a receiver and R3 may be a transmitter.

Ports of the transmitting and receiving windings (shown as circles) may be electrically connected to transmitter and receiver boards (not shown) that cause the transmitters T1-T4 to generate signals and cause the receivers R1-RN to measure the current responses caused by the generated signals. In certain embodiments, one or more of the transmitters T1-T4 may generate a signal in a target, and each of the receivers R1-RN may separately measure the response of the target to the signal. In certain embodiments, the combinations of transmitters and receivers used to generate EM signals and measure current responses may be varied dynamically by a control unit coupled to the transmitters T1-T4 and receivers R1-RN.

Figure 3:
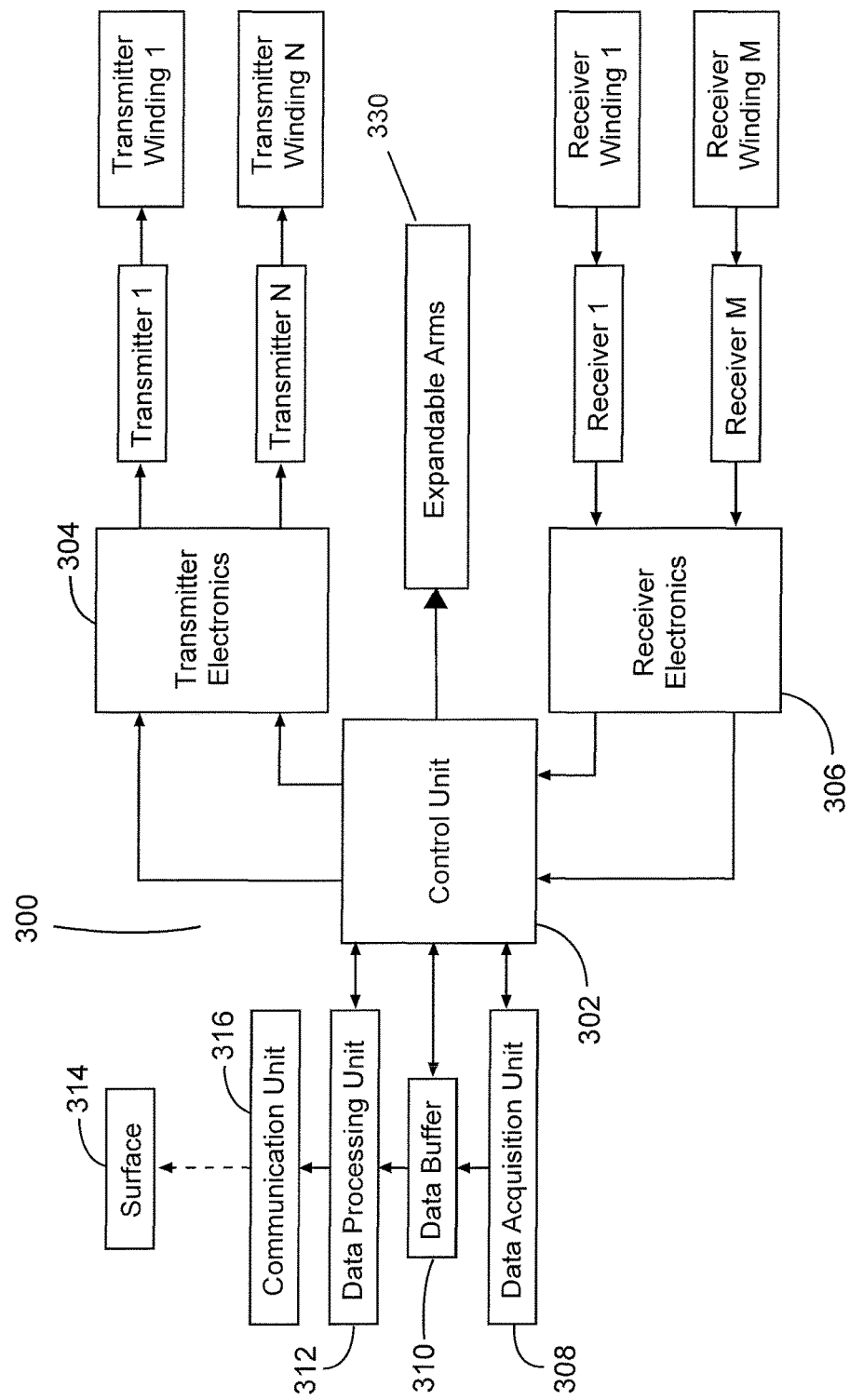
FIG. 3 is a diagram of an example control system for a downhole tool with conformable sensor array, according to aspects of the present disclosure.

In certain embodiments, a downhole tool with at least one conformable sensors may comprise a control system to control when and how the EM signals are transmitted and the responses are measured. FIG. 3 is a diagram of an example control system 300 for a downhole tool with conformable sensors, according to aspects of the present disclosure. The system 300 comprises a control unit 302 that may function as the primary controller for the tool and may be communicably coupled to transmitters 1-N through transmitter electronics 304, to receivers 1-M through receiver electronics 306, and to mechanical, electrical or hydraulic elements 330 coupled to and configured to extend pads to which the transmitters 1-N and receivers 1-M coupled. At least one of the transmitters 1-N and receivers 1-M may comprise elements of a conformable sensor or an array of conformable sensors. The transmitter electronics 304 and receiver electronics 306 may comprise circuit boards to which some or all of the transmitters 1-N and receivers 1-M are coupled.

The control unit 302 may trigger the transmitter electronics 304 to generate a time-varying EM signal through one or more of the transmitters 1-N. The time-varying signal may be a sinusoidal signal, its phase and amplitude set at a desired value. As is described above, the EM signals generated through the transmitters 1-N may be coupled to and generate eddy currents in the pipe or borehole that are in immediate contact with the conformable sensors, and the eddy currents may generate secondary currents that contain information about the pipe or borehole, including features of the pipe or borehole. The secondary currents generated by one or more of the transmitters 1-N of the conformable sensor array may be measured at the receivers 1-M. In the case of a frequency domain operation, the measurements from the receivers 1-M may be represented as voltage or current numbers in complex domain with real and imaginary parts, in phasor domain as amplitude and phase, or any other domain that can be obtained by analytical mapping from any of these domains. In the case of a time domain operation, the measurements from the receivers 1-M may be represented as magnitudes as a function of time which can be positive or negative. Results from time and frequency domain can be transferred from one to another by using Fourier transform or inverse Fourier transform.

The control unit 302 may receive the measurements from the receivers 1-N through the receiver electronics 306 and may transmit the measurements to the data acquisition unit 308. For a specific transmitter excitation, measurements from multiple receivers can be generated and received at the same time. Similarly, multiple transmitters 1-N can be excited at the same time and they can be time, frequency or jointly multiplexed for latter demultiplexing operation at the receivers. Upon reception at the data acquisition unit 308, the measurements may be digitized, stored in a data buffer 310, preprocessed at data processing unit 312, and sent to the surface 314 through a communication unit 316, which may comprise a downhole telemetry system.

In certain embodiments, the control unit 302 may further select the combinations of the transmitters and receivers to use to make measurements. The control unit 302 may comprise a set of instructions and may generate control signals to the transmitter and receiver electronics based, at least in part, on the instructions. For example, the control unit 302 may issue control signals to the transmitter and receivers to take different types of measurements within certain time periods. Example types of measurements include measurements with low-depth of investigations, medium depth of investigation, and high depth of investigation.

According to aspects of the present disclosure, the measurements from the conformable sensors may be may be aggregated and processed with a reference measurement set using pattern matching to determine at least one feature of a downhole element, such as the pipe or the formation. In certain embodiments, aggregating and processing the measurements may comprise aggregating and processing the measurements using a control unit located either within the downhole tool or the surface above the downhole tool. When processed at the surface, the measurements may be communicated to the surface in real time, such as through a wireline, or stored in a downhole tool and later processed when the tool is retrieved to the surface. The steps to perform the aggregation and processing may stored as a set of instructions in a memory device of the control unit such that a processor of the control unit performs the steps when it executes the instructions.

Figure 4:
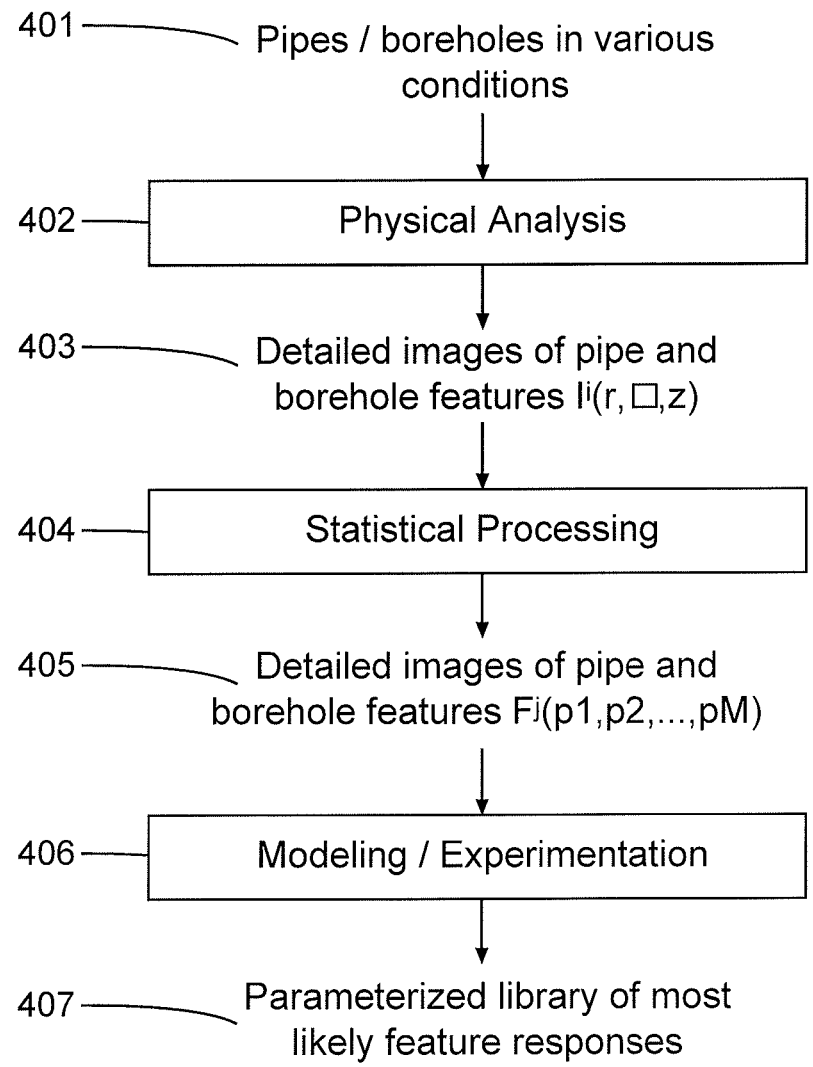
FIG. 4 is a flow diagram illustrating a method for generating a reference measurement set, according to aspects of the present disclosure.

FIG. 4 is a flow diagram illustrating a method for generating the reference measurement set, according to aspects of the present disclosure. The reference measurements set may comprise a library that maps potential feature types and parameters of a downhole element to estimated responses of a tool to those potential feature types and parameters. Step 401 may comprise identifying pipes and/or boreholes to be included within the library. The pipes and/or boreholes may be selected based on their features, so that different types of features (e.g., fractures, cracks, corrosion) with different parameters (e.g., size, shape, depth, and orientation) are included in the library. At step 402, the features may be imaged using techniques such as visual inspection, acoustic logging, coring, etc. Imaging the features may provide a representative set of response that may correspond to the measurements and responses generated in practice by conformable sensors.

The imaging performed at step 402 may result in a detailed set of images 403 corresponding to features of the pipes and/or boreholes from step 401. After the detailed set of images 403 is collected, a statistical analysis 404 may be performed to develop a parameterized set of most likely features 405, identifying the features most likely to be encountered by an actual downhole tool. The statistical analysis step 404 may be performed by fitting each image in the set 403 to a parameterization by solving a numerical optimization problem that yields matching feature type, parameters, and a relative position of the feature within the corresponding image. The best fit among all types of parameterizations may be selected as the type for the features in each image of the set 403, and the parameters of the feature may be associated with that parameterization may be stored.

For each type of parameterization, the range of variation and sensitivity of each parameter may be identified by running a histogram. Ranges of certain parameters may be chosen based on experience and observations rather than using statistics. After the ranges are identified, the parameterized set of most likely features 405 may be constructed by considering a large number of different parameter combinations for each feature type. The set 405 may comprise the most likely features and ranges and sensitivities of parameters corresponding to those features.

Generally, the more data points included in the set 403, the more statistically accurate the resulting parameterized set of most likely features 405 will be. In certain embodiment, more images can be provided in the set 403 by subdividing the identified boreholes and/or casing into sections. For example, a typical well depth axis, for example, can be divided into a large number of zones that are 0.1 inch to 10 feet long, and each zone can be considered a different sample to be imaged. The end points of a given zone can be selected manually or automatically to make sure each zone ideally contains one feature of interest, for example one crack, or one contagious cluster of cracks. Similar zoning can be applied to azimuthal dimension in combination with depth.

The parameterized set of most likely features 405 may be used in a modeling step 406 to simulate tool responses to the feature in set 405. In particular, a tool response for each feature type and parameter set in the parameterized set of most likely features 405 may be estimated using a simulation algorithm. The simulation algorithm may generate estimated tool responses for different configurations of tools, including those with conformable sensors. The modeled tool responses may be aggregated into a parameterized library of most likely feature responses 407, which may be mapped to the parameterized set of most likely features 405.

FIG. 5 is a chart of different feature types and corresponding parameters for a pipe, according to aspects of the present disclosure. As can be seen, the feature types for the pipe may comprise different types and orientations of cracks, holes, and scale. Scale may comprise buildup on the inside of the pipe that reduces its interior diameter. Each of the feature types may comprise at least one corresponding parameter that characterizes the physical structure of the feature. A similar chart can be used for a borehole, with the feature types including different types and orientations of fractures surrounding the borehole.

In certain embodiments, a parameterized set of most likely features and a parameterized library of most likely features responses may be generated before a downhole tool is placed downhole. The parameterized sets may be stored in an information handling system and accessed before or after measurements are taken downhole and received at the surface to process the measurements and identify features of downhole elements. In certain embodiments, processing the measurements may comprise processing the measurements using an inversion algorithm stored as a set of instructions in a memory device of the control unit and executable by a processor of the control unit. The inversion algorithm may be specific to the environment in which the downhole tool is used (cased or open hole) and may be designed to identify different features unique to the environment.

Figure 6:
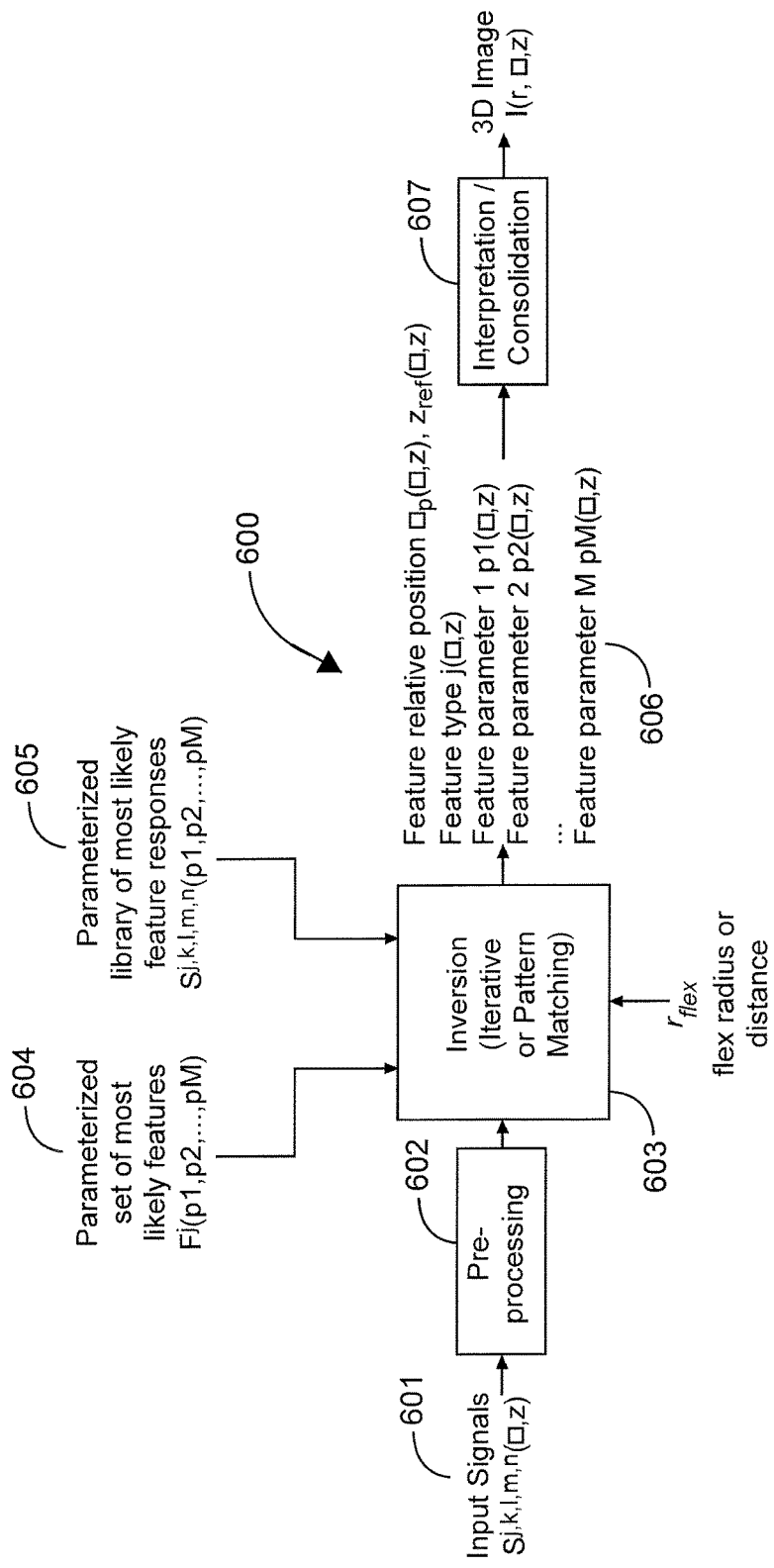
FIG. 6 is a block diagram of an example inversion algorithm, according to aspects of the present disclosure.

FIG. 6 is a block diagram of an example inversion algorithm 600 utilizing the parameterized set and library, according to aspects of the present disclosure. An input signal 601 may comprise measurements from the receivers of conformable sensors on the downhole tool. In certain embodiments, the input signals may be divided into time components and may be identified by the receiver which made the measurement and the transmitter that generated the eddy current/secondary current measured by the receiver.

The input signal 601 may be received at a pre-processing block 602 of the inversion algorithm 600. The pre-processing block 602 may process the input signals to compensate for downhole conditions or to convert the input signals to a form usable within the inversion block 603. For example, the pre-processing block 602 may process the measurements to calibrate for temperature effects, convert between frequency to time domain, convert between complex-value to phase and amplitudes, and/or to remove noise by filtering in azimuth or depth.

The inversion block 603 of the inversion algorithm 600 may receive the pre-processed input signals from the pre-processing block 602. The inversion block 603 may further receive a parameterized set of most likely features 604 and a parameterized library of most likely feature responses 605. The inversion block 603 may comprise a numerical optimization algorithm that minimizes the difference between the pre-processed input signals and the entries within the library 605. The minimization may be done by conducting a search in the library 605 for the responses closest to those in the pre-processed input signals. Once the closest response in the library 605 is identified, the corresponding relative position of the feature, feature type, and parameters associated with the feature may be extracted from the set 604 as output 606.

In certain embodiment, the inversion algorithm 600 may further comprise an interpretation/consolidation block 607 that may function to consolidate the output 606 into an image and produce a visualization of that image. In certain embodiments, rather that producing an image, the feature type or parameters in the output 606 can be plotted as a log. A histogram of the feature type and parameters can also be plotted. In certain embodiments, if a two-dimensional or three-dimensional image of the pipe or borehole is produce, names of the features can be plotted as text next to the feature with an accompanying arrow that points to the feature for easy visualization. In certain embodiments, the visualizations may be displayed on a display device, such as a monitor, coupled to the control unit or information handling system.

In certain embodiments, features that are considered to be of high risk can be flagged to the user by comparing the parameters to given thresholds. For example, if the depth of a hole is larger than a certain percentage of the pipe thickness, a flag can be raised. Similarly, if the depth or length of a crack is larger than a certain percentage of the pipe thickness, a flag can be raised. Based on the risk, appropriate action can be taken for remedying the situation.

Figure 8:
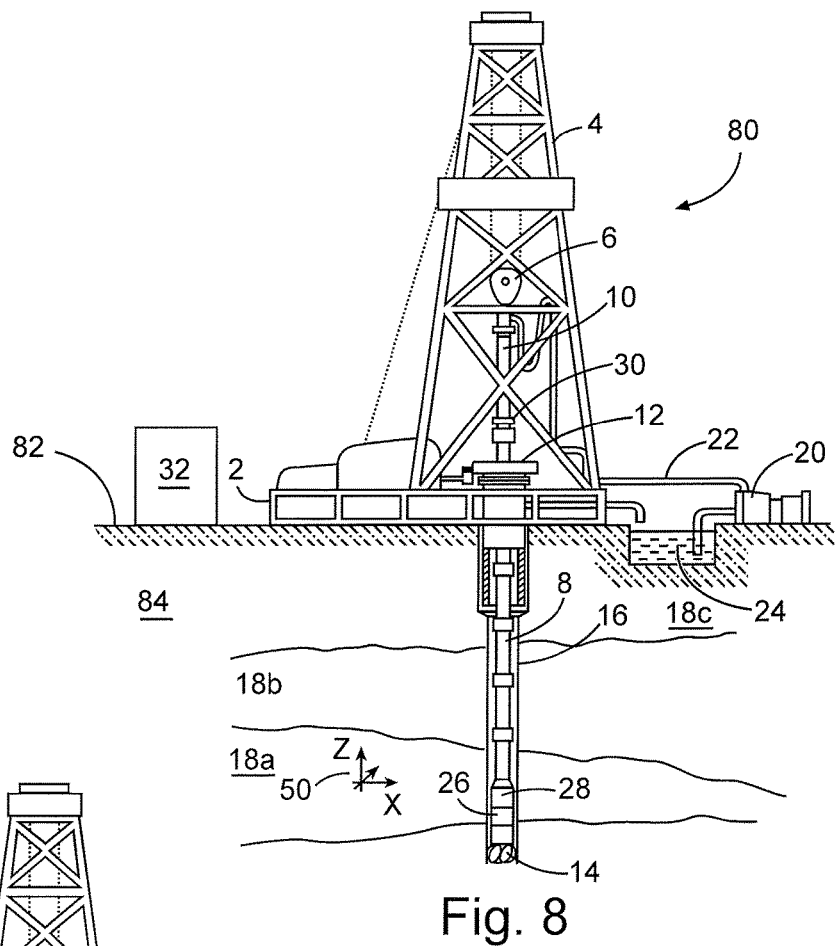
FIG. 8 is a diagram showing an illustrative logging while drilling environment, according to aspects of the present disclosure.

FIG. 8 is a diagram of a subterranean drilling system 80 incorporating a downhole tool 26 with conformable sensors arranged in a radial array, according to aspects of the present disclosure. The drilling system 80 comprises a drilling platform 2 positioned at the surface 82. In the embodiment shown, the surface 82 comprises the top of a formation 84 containing one or more rock strata or layers 18a-c, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) coupled to the drill string 8 near the drill bit 14. The BHA may comprise various downhole measurement tools and sensors and LWD and MWD elements, including the downhole tool 26 with a radial array of conformable sensors extending from the tool 26. As the bit extends the borehole 16 through the formations 18, the tool 26 may collect measurements relating to borehole 16 and formation the resistivity of the formation 84. In certain embodiments, the orientation and position of the tool 26 may be tracked using, for example, an azimuthal orientation indicator, which may include magnetometers, inclinometers, and/or accelerometers, though other sensor types such as gyroscopes may be used in some embodiments.

The tools and sensors of the BHA including the tool 26 may be communicably coupled to a telemetry element 28. The telemetry element 28 may transfer measurements from tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the tool 26 may also be stored within the tool 26 or the telemetry element 28 for later retrieval at the surface 82.

In certain embodiments, the drilling system 80 may comprise a surface control unit 32 positioned at the surface 102. The surface control unit 32 may be communicably coupled to the surface receiver 30 and may receive measurements from the tool 26 and/or transmit commands to the tool 26 though the surface receiver 30. The surface control unit 32 may also receive measurements from the tool 26 when the tool 26 is retrieved at the surface 102. As is described above, the surface control unit 32 may process some or all of the measurements from the tool 26 to determine certain parameters of downhole elements, including the borehole 16 and formation 84, and may also generate visualizations of the borehole 16 and formation 84 based, at least in part, on the determined parameters through which features of the downhole elements, such as cracks and fractures, may be identified.

Figure 9:
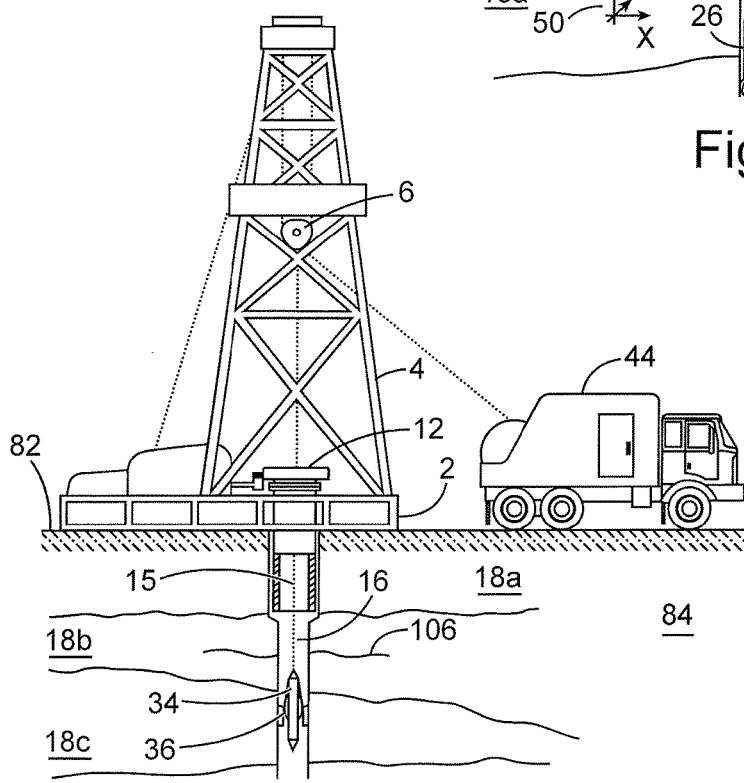
FIG. 9 is a diagram showing an illustrative wireline logging environment, according to aspects of the present disclosure.

At various times during the drilling process, the drill string 8 may be removed from the borehole 16 as shown in FIG. 9. Once the drill string 8 has been removed, measurement/logging operations can be conducted using a wireline tool 34, i.e., an instrument that is suspended into the borehole 16 by a cable 15 having conductors for transporting power to the tool and telemetry from the tool body to the surface 102. The wireline tool 34 may comprise a downhole tool 36 having a radial array of conformable sensors, similar to the tool 26 described above. The tool 36 may be communicatively coupled to the cable 15. A logging facility 44 (shown in FIG. 8 as a truck, although it may be any other structure) may collect measurements from the tool 36, and may include computing facilities (including, e.g., a control unit/information handling system) for controlling, processing, storing, and/or visualizing the measurements gathered by the tool 36. The computing facilities may be communicatively coupled to the tool 36 by way of the cable 15. In certain embodiments, the control unit 32 may serve as the computing facilities of the logging facility 44.

An example method for downhole surveying and measuring may include positioning a first conformable sensor proximate to a downhole element. The first conformable sensor may include a flexible material, a transmitter coupled to the flexible material, and a receiver coupled to the flexible material. A response of the downhole element to a signal generated by the transmitter may be measured at the receiver. The response may be processed to determine a feature of the downhole element. In certain embodiments, the downhole element may comprise a downhole pipe, and the set of possible features includes a hole, a crack, and scale. In certain embodiments, the downhole element may comprise a borehole, and the set of possible features includes a fracture.

In any of the embodiments described in the preceding paragraph, the method further comprises receiving a reference measurement set including a set of possible features for the downhole element, and processing the response using the reference measurement set to determine a feature of the downhole element. In certain embodiments, the reference measurement set comprises at least one of a set of parameters for each feature in the set of possible features and a relative position for each feature in the set of possible features, and processing the response with the reference measurement set to determine the feature of the downhole element comprises determining parameters corresponding to the feature. In certain embodiments, the parameters comprise physical characteristics of the feature.

In any of the embodiments described in the preceding two paragraphs, the method may further comprise generating a visualization based, at least in part, on the determines feature. In certain embodiments, the visualization comprises at least one of a histogram, a two-dimensional representation of the downhole element that identifies determined feature, and a three-dimensional representation of the downhole element that identifies determined feature. In certain embodiments, the method may comprise generating a flag corresponding to the determined feature. In certain embodiments, generating a flag corresponding to the determined feature comprises comparing a parameter of the determined feature to a threshold.

An example system for downhole surveying and measuring may comprise a conformable sensor coupled to a downhole tool. The conformable sensor may comprise a flexible material, a transmitter coupled to the flexible material, and a receiver coupled to the flexible material. The system may further include a processor communicably coupled to the downhole tool, wherein the processor is coupled to a memory device containing a set of instructions that, when executed by the processor, causes the processor to receive from the receiver a response of the downhole element to a signal generated by the transmitter; and process the response with the reference measurement set to determine a feature of the downhole element. In certain embodiments, the downhole element may comprise a downhole pipe, and the set of possible features includes a hole, a crack, and scale. In certain embodiments, the downhole element may comprise a borehole, and the set of possible features includes a fracture.

In any of the embodiments described in the preceding paragraph, the set of instructions may further cause the processor to receive a reference measurement set including a set of possible features for the downhole element, and process the response using the reference measurement set to determine a feature of the downhole element. In certain embodiments, the reference measurement set may comprise at least one of a set of parameters for each feature in the set of possible features and a relative position for each feature in the set of possible features, and the set of instructions that cause the processor to process the response with the reference measurement set to determine the feature of the downhole element further may cause the processor to determine parameters corresponding to the feature. In certain embodiments, the parameters comprise physical characteristics of the feature.

In any of the embodiments described in the preceding two paragraphs, the set of instructions further may cause the processor to generate a visualization based, at least in part, on the determines feature. In certain embodiments, the visualization comprises at least one of a histogram, a two-dimensional representation of the downhole element that identifies determined feature, and a three-dimensional representation of the downhole element that identifies determined feature. In certain embodiments, the set of instructions further causes the processor to generate a flag corresponding to the determined feature. In certain embodiments, the set of instructions that causes the processor to generate a flag corresponding to the determined feature further causes the processor to compare a parameter of the determined feature to a threshold.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee. The indefinite articles "a" or "an," as used in the claims, are each defined herein to mean one or more than one of the element that it introduces.

What is claimed is:

1. A method for downhole surveying and measuring, comprising
   receiving a reference measurement set including a set of possible features for a downhole element, before a first conformable sensor is positioned downhole; and
   positioning the first conformable sensor proximate to the downhole element, the first conformable sensor including
      a flexible material;
      a transmitter coupled to the flexible material; and
      a receiver coupled to the flexible material;
   measuring at the receiver a response of the downhole element to a signal generated by the transmitter; and
   processing the response to determine a feature of the downhole element using the reference measurement set.

2. The method of claim 1, wherein
   the downhole element comprises a downhole pipe; and
   a set of possible features includes at least one of a hole, a crack, and scale.

3. The method of claim 1, wherein
   the downhole element comprises a borehole; and
   a set of possible features includes a fracture.

4. The method of claim 1, wherein the reference measurement set comprises a library.

5. The method of claim 4, wherein
   the reference measurement set comprises at least one of a set of parameters for each feature in the set of possible features and a relative position for each feature in the set of possible features; and
   processing the response with the reference measurement set to determine the feature of the downhole element comprises determining parameters corresponding to the feature.

6. The method of claim 5, wherein the parameters comprise physical characteristics of the feature.

7. The method of claim 1, further comprising generating a visualization based, at least in part, on the determined feature.

8. The method of claim 7, wherein the visualization comprises at least one of a histogram, a two-dimensional representation of the downhole element that identifies determined feature, and a three-dimensional representation of the downhole element that identifies determined feature.

9. The method of claim 7, further comprising generating a flag corresponding to the determined feature.

10. The method of claim 9, wherein generating a flag corresponding to the determined feature comprises comparing a parameter of the determined feature to a threshold.

11. A system for downhole surveying and measuring, comprising
   a conformable sensor coupled to a downhole tool, the conformable sensor comprising
      a flexible material;
      a transmitter coupled to the flexible material; and
      a receiver coupled to the flexible material;
   a processor communicably coupled to the downhole tool, wherein the processor is coupled to a memory device containing a set of instructions that, when executed by the processor, causes the processor to
      receive a reference measurement set including a set of possible features for a downhole element, before the receive is positioned downhole;
      receive from the receiver a response of a downhole element to a signal generated by the transmitter after the receiver is positioned downhole; and
      process the response with a reference measurement set to determine a feature of the downhole element.

12. The system of claim 11, wherein
   the downhole element comprises a downhole pipe; and
   a set of possible features includes at least one of a hole, a crack, and scale.

13. The system of claim 11, wherein
   the downhole element comprises a borehole; and
   a set of possible features includes a fracture.

14. The system of claim 11, wherein the reference measurement set comprises a library.

15. The system of claim 14, wherein
   the reference measurement set comprises at least one of a set of parameters for each feature in the set of possible features and a relative position for each feature in the set of possible features; and
   the set of instructions that cause the processor to process the response with the reference measurement set to determine the feature of the downhole element further causes the processor to determine parameters corresponding to the feature.

16. The system of claim 15, wherein the parameters comprise physical characteristics of the feature.

17. The system of claim 11, wherein the set of instructions further causes the processor to generate a visualization based, at least in part, on the determines feature.

18. The system of claim 17, wherein the visualization comprises at least one of a histogram, a two-dimensional representation of the downhole element that identifies determined feature, and a three-dimensional representation of the downhole element that identifies determined feature.

19. The system of claim 17, wherein the set of instructions further causes the processor to generate a flag corresponding to the determined feature.

20. The system of claim 19, wherein the set of instructions that causes the processor to generate a flag corresponding to the determined feature further causes the processor to compare a parameter of the determined feature to a threshold.

* * * * *